Figures 1, 1A:
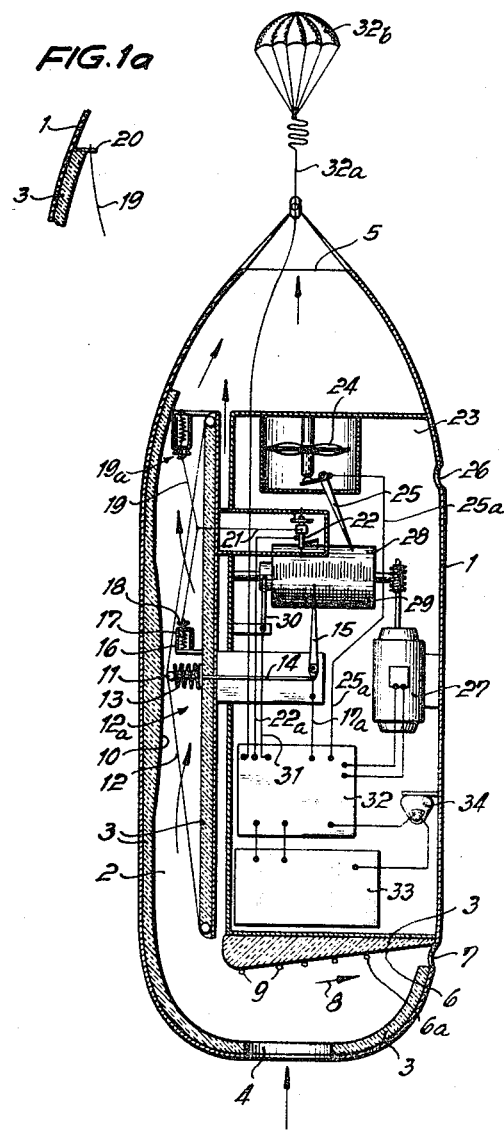

May 31, 1960

J. GRAW 2,939,127

RADIOSONDE FOR RELEASE FROM AIRCRAFT

Filed July 2, 1956

INVENTOR

J. Graw

By Mascock Downing Seebold
ATTYS.

United States Patent Office 2,939,127
Patented May 31, 1960

2,939,127

RADIOSONDE FOR RELEASE FROM AIRCRAFT

Josef Graw, Nurnberg, Germany, assignor to Dr. Graw Messgerate G.m.b.H., Nurnberg, Germany Filed July 2, 1956, Ser. No. 595,511

Claims priority, application Germany June 2, 1956

8 Claims. (Cl. 340—345)

The present invention relates to a radiosonde of the kind intended to be released from aircraft and incorporating instruments for the measurement of moisture, temperature, pressure, and so forth.

Such radiosondes are used for reporting the weather elements of the atmosphere. They are dropped from aircraft and are intended to fall to the ground at great speed whilst taking the desired measurements. The values of air pressure, temperature, and moisture, are transmitted in Morse code in a manner that is well understood.

However, known aircraft-dropped radiosondes are adapted to be released only from slow-flying craft. They are not suitable to be dropped from aeroplanes which fly at high speed such as jet-propelled aircraft because the speed with which they drop is not suited to the high speed of such planes. The plane would be out of radio range of the sonde before the latter had reached the ground.

It is the object of the present invention so to construct the radiosonde that its speed of descent conforms with the speed of the aircraft to enable the aircraft to receive the transmitted signals until the sonde is near the ground.

According to the invention a rapid rate of descent of the radiosonde is secured by providing it with an aerodynamically faired outer shell with an air entry orifice in its nose connected with an air exit orifice in its tail by means of a duct for the passage therethrough of the air that is to be subjected to measurement, the exit orifice having a smaller section than the duct, and the size of the entry orifice depending upon the aerodynamic shape of the shell and upon the size of the exit orifice, in such manner that the latter will not have a suction effect upon the air in the duct.

In virtue of its aerodynamic outline a radiosonde so constructed will have a high rate of descent and, owing to the particular construction of the entry and exit orifices the air inside the duct will not be compressed nor will it expand despite its high relative speed so that the temperature inside the duct will be equal to that of the atmospheric strata traversed by the sonde as it falls.

The air duct as well as the instruments must be adapted to the high speeds of descent attainable by a sonde constructed according to the invention. For instance, disturbing elements contained in the air, such as droplets of water, ice crystals, and dust, must be removed, and high sensitivity of the instruments is required to enable them to respond to the rapidly changing atmospheric conditions as the radiosonde falls. At the entry orifice there is therefore provided a deflecting surface which inclines towards an opening cut into the side of the sonde so that part of the air will be spilled through this lateral opening. The cross section of the opening must be such that the air is decelerated and some of it forced into the air duct. However, any water droplets, ice crystals, etc. are deflected towards, or trickle out of the opening so that only purified air can enter the duct.

To permit the air pressure to be reliably measured despite the high rates of descent that can be achieved by the present invention the air pressure chamber containing the pressure gauge is entirely separate from the duct, the chamber communicating with the outside atmosphere through holes in the shell located in a region which is aerodynamically neutral.

A particularly useful sensing element for the temperature gauge is a quick-response thermometer wire, known as such, and the gauge may be provided in a manner likewise well known, with a plurality of wires arranged like the strings of a harp and tautened by a powerful compression spring.

A most useful sensing element for the quick-response hygrometer disposed in the air duct is a rolled hair protected against damage from shock by at least one of its ends being elastically suspended from the walls of the duct, for instance by means of a spring, a stop being provided for securing the spring which carries the hair, and urged in its position of rest into contact with a casing containing the spring so as to relieve the load on the hair. The advantage inherent in this form of construction is its high sensitivity to changes in moisture and its consequent adaptability to the sudden variations that may occur during the rapid descent of the sonde. Since a rolled hair has a low tensile strength and might tear when the sonde is released from the plane the elastic element will provide the necessary degree of protection.

To ensure that the radiosonde commences to work at the appropriate moment, that is to say, immediately it has been released, without the need of effecting adjustments just before it is actually dropped, a position-controlled mercury switch is provided to start up the electric equipment, more particularly the transmitter and an electric motor for driving the mechanical devices, inside the sonde.

Further details of the invention will be hereinafter explained in the following particular description of an illustrative form of construction shown in the accompanying drawing.

The radiosonde is provided with an outer shell 1 of aerodynamic shape. Inside the sonde and approximately parallel with the main axis thereof there is disposed an air duct 2 the walls of which are protected by means of a thermally insulating lining 3. This protective lining prevents the air temperature inside the duct from being affected by the transfer of heat through the metal shell 1. The air duct 2 communicates with the outer atmosphere through an air entry orifice 4 and an air exit orifice 5 disposed coaxially with the sonde. The air entry orifice 4 has a smaller cross section than the smallest cross section of the duct 2. This prevents the temperature of the air in the duct from being raised by compression. The diameter of the air exit orifice 5 is adapted to the diameter of the air entry orifice 4 and the aerodynamic flow of the air over the outer shell 1 of the sonde, in such a manner that no depression is created inside the duct 2. This prevents a reduction of the temperature of the air inside the duct by expansion.

Opposite the air entry orifice 4 is a deflecting surface 6 which projects the main airstream through an opening 7 cut into the side of the shell 1. The deflecting surface 6 collects droplets of water, ice crystals, and the like contained in the air and discharges them through the opening 7 as shown by the arrow 8. The air that has been decelerated by the deflector then enters the air duct 2.

The surface 10 of the air duct is slightly curved and thereby forces the airstream towards the centre of the duct 2. Across the face of surface 10 is a bridge 11 for the wires of a wire temperature gauge 12a. A number of thermometer wires 12 are stretched across the bridge in the manner of the strings of a harp. The distance of the bridge from the surface 10 should be a minimum at maximum temperature to ensure the maximum volume of air passing between the thermometer wires 12. A powerful compression spring 13 urges the bridge 11 towards the wall and thereby maintains the tension of the wires 12. The bridge 11 is connected by means of a linkage 14 with a pointer 15, so that every movement of the bridge entrains a corresponding deflection of the pointer 15.

Above the wire temperature gauge 12a is a hygrometer 19a. Secured to the inside wall of the duct 2 is a casing 16 in which a weak spring 17 is suspended. The free end of the spring 17 carries a stop 18, which is adapted to apply itself to a cooperating part of the casing wall 16. Secured to the stop 18 is a rolled human hair 19 the other end of which is attached to a pin 20 secured to the wall of the duct 2. The pin 20 may be replaced by a yielding member 16, 17, 18 of the kind already described. When the hair 19 is not tightly stretched the stop 18 is held in contact with the casing 16, whereas the spring 17 prevents the hair 19 from being strained. A connecting hair 21 is attached to the middle of the rolled hair, with its remote end secured to a pointer 22. The pointer is deflected against the counterpressure of a spring, not shown in the drawing, when the rolled human hair expands or contracts in accordance with the moisture content of the air.

A special pressure chamber 23 contains a pressure gauge 24 which actuates a pointer 25 through an appropriate lever transmission. The pressure chamber 23 communicates with the outside atmosphere through an opening 26 in the shell 1. The opening 26 is so located that a dynamic positive or negative pressure will not be created inside the chamber. In other words the opening 26 is located in a neutral zone.

All the pointers 15, 22, 25 are connected by leads 17a, 22a, and 25a with a transmitting circuit in a transmitter 32. The free end of each pointer 15, 22, 25 makes contact with a contact drum 28 insulated from the body of the sonde and driven by a motor 27. The contact drum 28 has a number of axial brightly polished grooves 29 which can come into contact with the pointers 15, 22, 25. These grooves represent the Morse code symbols. Bevelled lead-in surfaces to the grooves 29 ensure that the contact pointers 15, 22, 25 slide in the grooves only during the actual periods of measurement. The remaining surface of the contact roller 28 is electrically insulated for instance by having been anodised. A sliding contact 30 and a lead 31 connect the contact drum with the opposite terminals of the transmitting circuits of the transmitter 32.

A battery 32 which also supplies the motor 27 provides the necessary current and potentials for the operation of the transmitter 32.

The transmitter 32 and the motor 27 are automatically cut in by the closing of a tilting mercury switch 34 which is closed only when the sonde is in the vertical position.

The transmitter 32 has an aerial 32a which is expanded and held taut by a parachute which brakes the descent of the sonde after it has been released.

The radiosonde as described operates as follows: The sonde, possibly enclosed in a case, is horizontally suspended in the aircraft from a release mechanism. The mercury switch 34 is off, so that neither motor 27 nor transmitter 32 receive power. As soon as the sonde is released and drops it assumes a vertical position. The switch 34 cuts in the battery. The transmitter 32 is ready to transmit and the motor 27 starts up and rotates the contact drum 28.

At the same time air begins to enter the interior of the sonde through the air entry orifice 4. The airstream first impinges upon the deflecting surface 6. Owing to the obliquity of this surface 6 the airstream is primarily forced into the direction of the arrow 8. Fog particles, ice grains, etc. that are introduced with the air are either deflected or they are driven, 6a, by the current along the deflecting surface 6 and out of the opening 7. Since the opening 7 is smaller than the air entry orifice 4 and the deflecting surface 6 is slightly inclined, an air surge is produced and some of the air enters the air duct 2. During its passage through the duct 2 the wire temperature gauge 12a is first affected. The resultant movement of the bridge 11 is transmitted through the linkage 14 to the pointer 15. As the pointer 15 engages one of the grooves 29 in the contact drum 28 the appropriate transmitting circuit of the transmitter 32 is closed via the sliding contact 30 of the contact drum 28 and the lead 17a from the pointer 15. The relative circuit in the transmitter 32 generates a signal. As the drum 28 continues to be revolved by the motor 27 the pointer 15 slides on to one of the insulated surfaces between the rows of grooves 29 on the contact drum 28 so that the circuit 32, 17a, 15, 28, 30 is again de-energised. No signal is therefore transmitted. Any change in the position of the bridge 11 whilst the pointer 15 engages one of the grooves 29 merely causes the pointer 15 to be slightly elastically deformed without its actually leaving the groove 29. However, as soon as the pointer 15 moves on to the smooth part of the drum, it will at once adjust itself to any displacement of the bridge 11 that may have occurred meanwhile.

The air also affects the rolled human hair 19 of the hygrometer 19a in the duct 2. Any variation in the velocity of the air that might cause the hair 19 to be subjected to a sudden strain is taken up and compensated by the spring 19. Such jolts do not modify the contact position of the pointer 22 on the contact drum 28. In the manner that has already been described this pointer 22 likewise opens and closes contacts in a second transmitting circuit of the transmitter 32, thus causing an equivalent series of signals to be transmitted.

The air pressure which acts through the opening 26 controls the position of the pointer 25 through the air pressure gauge 24. Again in the manner already described pointer 25 controls a third transmission circuit in the transmitter 32 and produces a third set of independent signals.

This arrangement causes independent sets of Morse signals to be transmitted in appropriate sequence and under the control of the quick-response instruments despite a very high rate of descent of the radiosonde. Owing to the rapidity of descent of the sonde the entire length of drop is explored before even a high-speed aircraft has had time to fly out of the radio range of the sonde. The incorporation of the deflecting surface 6 and of the spring element 16 provides a considerable measure of protection to the instruments against damage and unwanted effects due to the speed. Since the opening 26 is arranged at a neutral point in the aerodynamic flow pattern around the outer surface of the sonde the measured pressure corresponds with the actual pressure. Moreover, since the cross section of the duct is adapted to the size of the orifices 4 and 5, as has been described, the temperature of the air in the duct is not raised by compression nor lowered by expansion so that the true temperatures and the true moisture values will be reported.

It will be readily understood that it is quite possible to include other instruments in the radiosonde in conformity with the general arrangement that has been described and that their readings can be arranged to control appropriate transmitting circuits in the transmitter.

What we claim is:

1. A high speed ejection radiosonde incorporating devices for measuring temperature, humidity and pressure during rapid descent of the sonde, comprising a casing having a geometrical axis and streamlined to facilitate rapid descent along the geometrical axis, an air duct within said casing, the temperature and humidity measuring devices being located in said air duct, a lower inlet orifice for said air duct, and an upper outlet orifice for said air duct, said inlet and outlet orifices being located at the ends of said casing and centred on the geometrical axis thereof, the inlet orifice being of smaller cross section than the air duct, and the outlet orifice having a larger cross section than the inlet orifice, the said cross sections being so related that for a certain desired range of falling speeds of the radiosonde no dynamic suction is created in the air duct by the outlet orifice.

2. A high speed ejection radiosonde incorporating devices for measuring temperature, humidity and pressure during rapid descent of the sonde, comprising a casing having a geometrical axis and streamlined to facilitate rapid descent along the geometrical axis, an air duct within said casing, the temperature and humidity measuring devices being located in said air duct, a lower inlet orifice and an upper outlet orifice for said air duct, said inlet and outlet orifices being located at the ends of said casing and centred on the geometrical axis thereof, the inlet orifice being of smaller cross section than the air duct, and the outlet orifice having a larger cross section than the inlet orifice, the said cross sections being so related that for a certain desired range of falling speeds of the radiosonde no dynamic suction is created in the air duct by the outlet orifice and a deflecting surface located inside the inlet orifice and inclined towards an opening in the side of the casing so as to deflect part of the entering air stream towards and through said opening, decelerate the air stream and guide another part of the air stream into the air duct.

3. A radiosonde as claimed in claim 1 in which the casing is of metal and the air duct is internally lined with a heat insulating material.

4. A radiosonde as claimed in claim 1 comprising an air chamber separate from the air duct and communicating with the outside atmosphere through holes located in a region of the casing that is aerodynamically neutral, the pressure measuring device being located in said chamber.

5. A radiosonde as claimed in claim 1 comprising within the casing a battery, a position controlled mercury switch, a transmitter, an electric motor, a contact drum drivably connected with said motor, and switching elements for connecting the output of the contact drum with the transmitter, the mercury switch being arranged to complete the connection between the battery and the motor and transmitter when the axis of the casing is moved out of the neutral, substantially horizontal position which it occupies when the sonde is carried to the substantially vertical position in which it falls.

6. A radiosonde as claimed in claim 5 in which the humidity measuring device comprises a rolled hair located in the air duct, spring means resiliently securing at least one end of the hair to the wall of the air duct, or housing for the spring means, stop means normally urged by said spring means into contact with said housing to relieve the rolled hair of load, a contact element co-operating with said contact drum and a connecting member connecting said rolled hair with said contact element.

7. A radiosonde as claimed in claim 5 wherein the temperature measuring device comprises a temperature sensitive element consisting of at least one wire the ends of which are secured to a common side of the air duct, a bridge element over which the temperature sensitive element is stretched, a compression spring acting on said bridge element to urge the middle of the temperature sensitive element towards a portion of the air duct opposite said common side whereby expansion and contraction of the temperature sensitive element due to temperature changes causes movement of the bridge element, and a contact element by which the bridge element co-operates with the contact drum.

8. A radiosonde as claimed in claim 7 in which the air duct has entry and outlet portions connecting with said inlet and outlet orifices the temperature sensitive element being secured to points located adjacent said entry and outlet portions.

References Cited in the file of this patent

UNITED STATES PATENTS

| 1,784,922 | Allen | Dec. 16, 1930 |
| 2,347,345 | Wallace | Apr. 25, 1944 |
| 2,454,320 | Hornbostel | Nov. 23, 1948 |
| 2,526,631 | Brady | Oct. 24, 1950 |
| 2,547,009 | Huston | Apr. 3, 1951 |
| 2,604,582 | Hauck | July 22, 1952 |

OTHER REFERENCES

"An Improved Radio Sonde and Its Performance," Diamond et al., National Bureau of Standards, vol. 25, September 1940.

"Instructions Radiosonde Set AN/AMT-9A," Bendix Aviation Corp., September 1953.